United States Patent [19]
Schultink et al.

[11] Patent Number: 5,871,836
[45] Date of Patent: Feb. 16, 1999

[54] COMPOSITE PLEATED FIBROUS STRUCTURES CONTAINING SPLIT FILM FIBERS

[75] Inventors: Jan Schultink, Eksel; Bas Schultink, Overpelt, both of Belgium; Larry C. Wadsworth, Knoxville, Tenn.

[73] Assignee: Airflo Europe N.V., Overpelt, Belgium

[21] Appl. No.: 921,213

[22] Filed: Aug. 27, 1997

[51] Int. Cl.⁶ ........................................ B32B 3/28
[52] U.S. Cl. .............................. 428/181; 428/182; 55/521
[58] Field of Search ................................ 425/181, 182; 55/521

[56] References Cited

U.S. PATENT DOCUMENTS

| | | | |
|---|---|---|---|
| 4,178,157 | 12/1979 | van Turnhout | 55/155 |
| 4,323,374 | 4/1982 | Shinagawa et al. | 55/521 |
| 5,038,775 | 8/1991 | Maruscak | 128/205.27 |
| 5,098,767 | 3/1992 | Linnersten | 428/182 |
| 5,401,446 | 3/1995 | Tsai et al. | 264/22 |
| 5,423,903 | 6/1995 | Schmitz et al. | 55/521 |
| 5,436,054 | 7/1995 | Tani et al. | 428/136 |
| 5,709,735 | 1/1998 | Midkiff et al. | 55/521 |

Primary Examiner—Newton Edwards
Attorney, Agent, or Firm—Weiser and Associates, P.C.

[57] ABSTRACT

A novel pleated fibrous structure is disclosed, which fibrous structure comprises a layer of a pleated split fiber film. The layer of split fiber film may be electrostatically charged. The pleated split fiber film may be part of a composite fibrous structure further comprising a support of a nonwoven or scrim.

35 Claims, 11 Drawing Sheets

A— NONWOVEN OR SUPPORTING SCRIM (MAY BE PRE-ELECTRICALLY CHARGED)

B— ADHESIVE

C— MELT BLOWN WEB (PRE-ELECTRICALLY CHARGED)

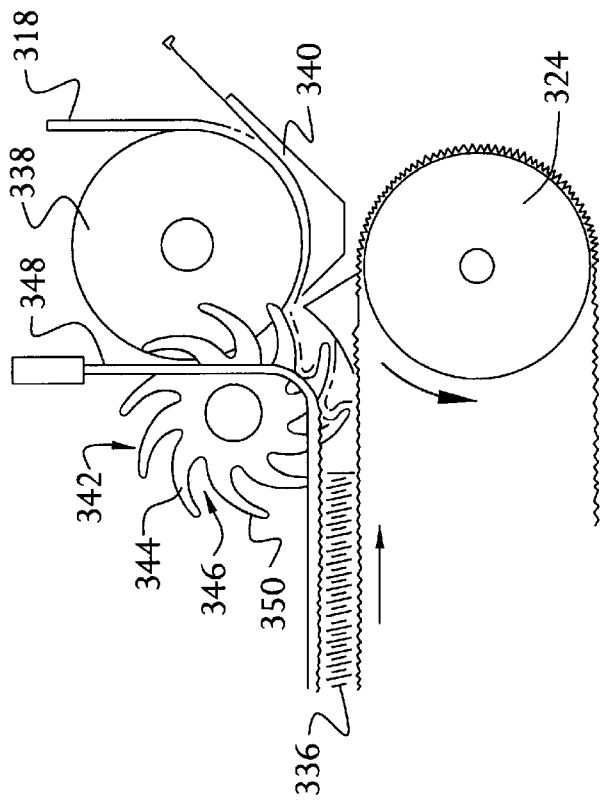
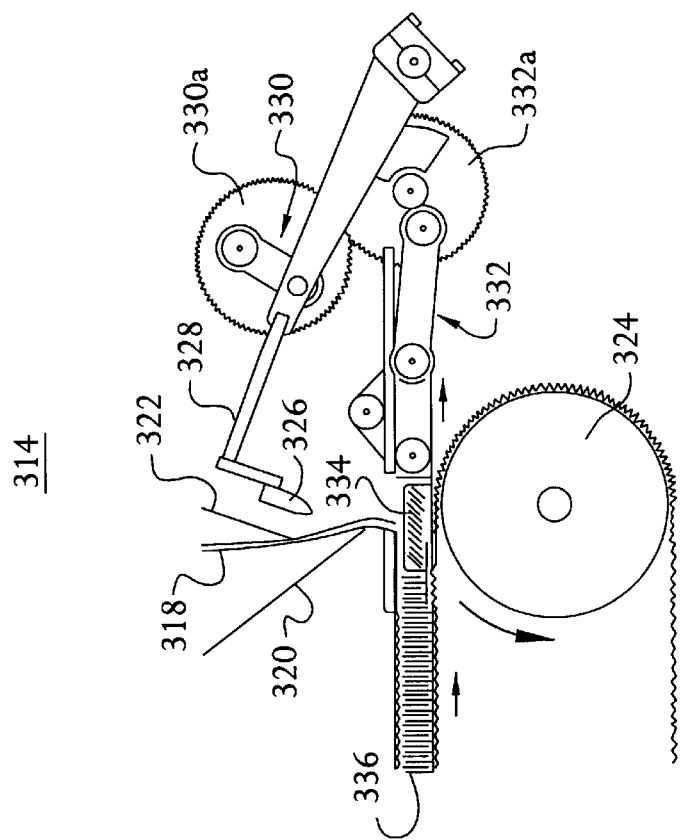
FIG. 6B
FIG. 6A

COMPOSITE PLEATED FIBROUS STRUCTURES CONTAINING SPLIT FILM FIBERS

FIELD OF THE INVENTION

The present invention relates to novel composites of pleated filter media consisting of split film fiber and a support, such as a nonwoven web or a scrim. The invention also relates to such composites in which the split film fibers may be electrostatically charged before and after the composites are prepared. The composites of the invention are particularly useful as insulation or as filters.

BACKGROUND OF THE INVENTION

Pleated and/or electrically charged fibrous materials to be used as a filtration medium have been known for some time. The electrostatic charging of fibrous materials and its shortcomings are reviewed in U.S. patent application No. 5,401,446, issued Mar. 28, 1995, and incorporated herein by reference.

Currently available methods for cold charging a web have problems developing the desired charge densities and, in addition, suffer from the problem of having the charge bleed off the web with time.

Pleating the filters increases filtering efficiency, without producing as high a pressure drop as would be caused by more closely packing the fibers. Pleating also results in increased ability to retain dust which is filtered and removed from the environment.

A need exists for pleated and non-pleated composite structures, useful for filters, which have the capability to maintain a high level of electrostatic charge.

SUMMARY OF THE INVENTION

It is an object of the present invention to provide novel composite pleated fibrous structures which are based on split film fibers. The composite structure further comprise a nonwoven web or scrim to provide a supported porous filter. The split fibers and/or the supporting elements of the composite structure may or may not be electrostatically charged before or after preparation of the composite.

It is often advantageous to pre-charge the key components of the composite contributing to filtration efficiency prior to joining the components together. Melt blown, spunbond and other nonwovens may be pre-charged by any suitable method of imparting an electrostatic charge, for example by the electrostatic charging techniques developed by Tsai and Wadsworth (U.S. Pat. No. 5,401,446).

In general, a film can be charged to a much higher voltage potential (resulting in a more effective electrostatic charging) than is obtainable by charging a web. Without being bound by theory, it is believed that films are more easily and more highly charged than fibrous webs because films have very little void space between fibers compared to fibrous webs. Thus with any electrostatic charging system, there is more solid polymer per unit surface area to accept the ions generated by corona discharge. Also, when charging a fibrous web, more of the ions generated may be deflected around the fibers, rather than be forced to penetrate into the substrate, as compared to when charging a film.

Split fiber films, according to the invention, are even more advantageously electrostatically charged than are films made not in accordance with the invention. Because split fibers are rectangular in shape and present a flat surface, like a ribbon, the fibers are maintained in very close proximity to each other and the ions generated by a corona discharge tend to be absorbed into the fiber, rather than being deflected.

These and other objectives which will become apparent to one skilled in this art are achieved by the discovery of the novel pleated composite structures of the invention comprising split film fibers and nonwovens and/or scrims, which components may optionally be electrostatically charged.

The split film fiber and nonwoven components of the composites of the invention may be held together as laminated structures by various means such as heat fusion (e.g. at discrete points) of fiber having lower melting point than the melting point of the remaining webs.

Alternatively bonding of the components may be by the use of bi-component core/sheath fibers as a blend with the split film fiber component. An example of core/sheath bi-component fibers that may be used include a poly [ethylene terephthalate] polyester core and a lower melting polyester copolymer of PP and PE copolymer as the sheath. The bi-component fibers may be used in side-by-side and other configurations.

Low melting temperature homopolymers, for example of PP/PE copolymers, PET and PE copolymers, or other polyester copolymers, are additional examples of low melting temperature binder fibers that may be used. In such an example, a bi-component fiber with a sheath of polyethylene, for lower melting temperature, and a core of polypropylene, for better mechanical properties, could be utilized. Also, if desired, a hot melt adhesive, which may be applied by melt blowing or other spraying techniques, may be utilized to adhere a pleated component to a base fabric.

Hot melt adhesives may also be sprayed onto a single component structure, and the structure may then be pleated and heat fixed (stabilized). Examples of such single component structures include a web of split film fibers, a melt blown web, or other types of nonwovens. Often it is desirable to electrically charge the component before applying the adhesive. Laminate structures may be formed by spraying a hot melt adhesive between the layers to be joined together prior to pleating. Pleated "single" or "multi-component" structures may then be stabilized farther by spraying an adhesive on either the supporting component or on the pleated structure, as discussed herein.

Alternatively one or more webs may be positioned at appropriate selected positions between adjacent layers of the composite structure, which upon the application of heat, will likewise provide a satisfactory adhesive bond.

An adhesive may be used which will become tacky at a temperature below that at which the electrostatic charge on the fibers is removed. For example, heating polypropylene (PP) fibers coated with an adhesive to a temperature at which the adhesive melts but below that at which the fibers melt, such as about 100° C., typically results in adequate retention of a previously applied electric charge.

The fibers, themselves, also may be used as binders. For example, it has been observed that heating electrostatically charged PP fibers to a temperature at which the fibers become tacky but below that which causes shrinking of the PP fibers typically does not remove the previously applied electrostatic charge on the fibers to an objectionable extent.

This relationship between the possible bleeding off of the electrostatic charge and the temperature at which the fibers become tacky is applicable to all the materials taught in this specification.

The split film fibers are essentially flat, rectangular fibers which may be electrostatically charged before or after being incorporated into the composite structure of the invention. The thickness of the split film fibers may range from 2–100 micrometers (μm), the width may range from 5 micrometers to 2 millimeters (mm), and the length may range from 0.5 to 10 inches. However, the preferred dimensions of the split film fibers are a thickness of about 5 to 20 μm, a width of about 15 to 60 μm, and a length of about 0.5 to 3 inches.

The split film fibers of the invention are preferably made of a polyolefin, such as polypropylene (PP). However, any polymer which is suitable for making fibers may be used for the split film fibers of the composite structures of the invention. Examples of suitable polymers include polyolefins, but are not limited to, like homopolymers and copolymers of polyethylene, polyterephthalates, such as poly(ethylene terephthalate) (PET), poly(butylene terephthalate) (PBT), poly(cyclohexyl-dimethylene terephthalate) (PCT), polycarbonate, and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The split film fibers may also comprise a mixture of homopolymers or copolymers. In the present application, the invention is exemplified with split film fibers made of polypropylene (PP).

The use of PP polymers with various molecular weights and morphologies in laminate film structures has been shown to produce films with a proper balance of mechanical properties and brittleness required to produce split film fibers. See (*reference new 3M patent). These PP split film fibers may also be subsequently given the desired level of crimp. All dimensions of the split film fibers may, of course, be varied during manufacture of the fibers.

One method for production of the split fibers, is disclosed in U.S. Pat. No. 4,178,157, which is incorporated by reference. Polypropylene is melted and extruded into a film which is then blown into a large tube (balloon) into which ambient air is introduced or allowed to enter, in accordance with conventional blow stretching technology. Inflating the balloon with air serves to quench the film and to bi-axially orient the molecular structure of the PP molecular chains, resulting in greater strength. The balloon is then collapsed and the film is stretched between two or more pairs of rollers in which the film is held in the nip of two contacting rollers, with the application of varying amounts of pressure between the two contacting rollers. This results in an additional stretch in the machine direction which is accomplished by driving the second set of rollers at a faster surface speed than the first set. The result is an even greater molecular orientation to the film in the machine direction which will subsequently become the long dimension of the split film fibers.

The film may be electrostatically charged before or after it has been cooled down. Although various electrostatic charging techniques may be employed to charge the film, two methods have been found to be most preferable. The first method involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 Kv.

The second, preferred, method utilizes the electrostatic charging technologies described in U.S. Pat. No. 5,401,446 (Wadsworth and Tsai, 1995), which is referred to as Tantret™ Technique I and Technique II, which are further described herein. It has been found that Technique II, in which the film is suspended on insulated rollers as the film passes around the inside circumference of two negatively charged metal shells with a positive corona wire of each shell, imparts the highest voltage potentials to the films. Generally, with Technique II, positive 1000 to 3000 volts or more may be imparted to on one side of the films with similar magnitudes of negative volts on the other side of the charged film.

Technique I, wherein films contact a metal roller with a DC voltage of −1 to −10 kV and a wire having a DC voltage of +20 to +40 kV is placed from about 1 to 2 inches above the negatively biased roller with each side of the film being exposed in succession to this roller/wire charging configuration, results in lower voltage potentials as measured on the surfaces of the films. With Technique I, voltages of 300 to 1500 volts on the film surface with generally equal but opposite polarities on each side are typically obtained. The higher surface potentials obtained by Technique II, however, have not been found to result in better measurable filtration efficiencies of the webs made from the split film fibers. Therefore, and because it is easier to lace up and pass the film through the Technique I device, this method is now predominately used to charge the films prior to the splitting process.

The cooled and stretched film may be hot or cold electrostatically charged. The film is then simultaneously stretched and split to narrow widths, typically up to about 50 μm. The split, flat filaments are then gathered into a tow which is crimped in a controlled numbers of crimps per centimeter and then cut into the desired staple length. The cut tow is then subjected to a carding process to form a web of the desired basis weight. The split film fibers may also be formed into a web by other web forming processes, such as air-laying.

After being formed into a web, the web of split film fibers may be lightly needled to provide sufficient strength for an intermediate winding and unwinding step, unless the unbonded web can be directly incorporated into the composite of this invention, so that this intermediate step is not needed.

BRIEF DESCRIPTION OF THE DRAWINGS

FIG. 6A and 6B are schematic drawings showing alternative embodiment lappers for use with the apparatus shown in FIG. 6.

DETAILED DESCRIPTION OF THE INVENTION

In the description which follows the term "web" has been used for consistency and convenience. The term "web" as used herein includes such terms as "film", "composite web", "folded composite", "composite structure", or other such terminology conventionally used in this art.

Figure 1:
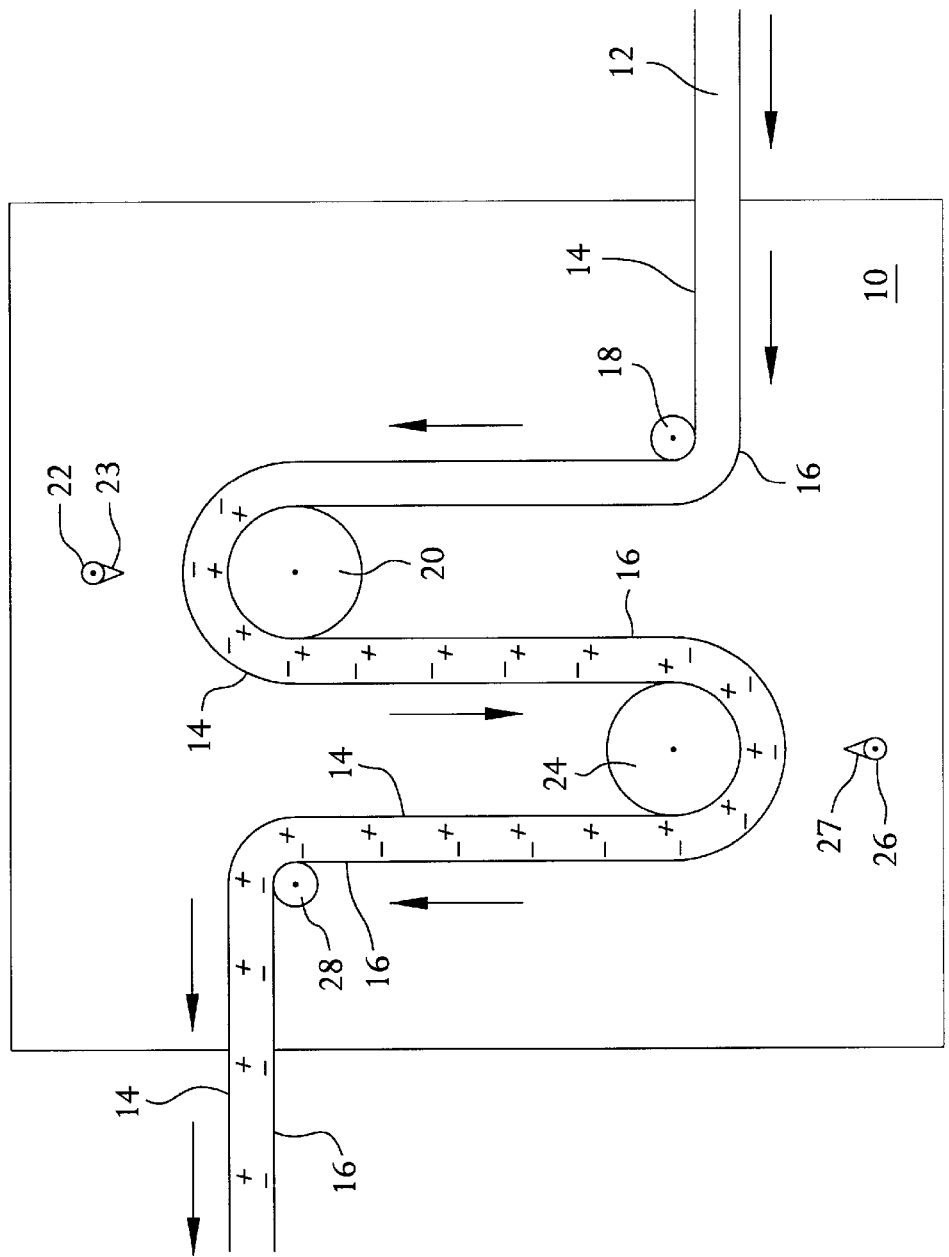
FIG. 1 is a schematic view of one embodiment of the present invention for cold charging a web.

Referring now to the drawings in which like reference characters designate like or corresponding parts throughout the several views, FIG. 1 shows an embodiment of an apparatus 10 for cold charging a web in accordance with the present invention.

The apparatus 10 generally comprises an uncharged moving web 12 having a first side 14 and a second side 16. The web 12 may have a triboelectric charge associated with the relative inherent electronegative/electropositive nature of the polymer. In addition, the web 12 may be a web that has been precharged by either a hot or cold charging process. The web 12 passes into the apparatus 10 with the first side 14 in contact with positioning roller 18. The second side 16 of the web 12 then comes in contact with the first charging drum 20 which rotates with the web 12 and brings the web 12 into a position between the first charging drum 20 and a first charging bar 22.

In the following discussion, the first charging drum 20 is assumed to be "negatively charged" (i.e., at a negative potential) and the first charging bar 22 is assumed to be "positively charged" (i.e., at a positive potential). These assumptions are for the ease of describing the operation of the invention only and are not intended to limit the scope of the invention to those specific relative potentials.

As the web 12 passes between the charging bar 22 and the charging drum 20, an electrostatic charge is developed adjacent the two sides 14 and 16 of the web 12. A relative negative charge is developed adjacent the first side 14 of the web 12 and a relative positive charge is developed adjacent the second side 16 of the web 12. The web 12 then passes on to a "negatively charged" (i.e., at a negative potential) second charging drum 24 and, further, to a position between the charging drum 24 and a second "positively charged" (i.e., at a positive potential) charging bar 26 where the web 12 has the polarity of its charge reversed. This effect is seen in polyolefin fibers but is not always seen in webs prepared from fibers of, for example, polyesters or PCTFE. That is, a relative positive charge is developed adjacent the first side 14 of the web 12 and a relative negative charge is developed adjacent the second side 16 of the web 12. The charged web 12 then passes on to a positioning roller 28 and out of the apparatus.

For the charging of webs, both of the charging drums 20 and 24 are held at a relative negative charge (or grounded) while the charging bars 22 and 26 are held at a relative positive charge. However, since different sides of the web 12 are in contact with the charging drums (the second side 16 is in contact with the first charging drum 20 and the first side 14 is in contact with the second charging drum 24) the charges adjacent to the sides 14 and 16 of the web 12 are changed during the charging of the web 12 in the apparatus 10. Thus, the first side 14 is first negatively charged and then positively charged, and the second side is first positively charged and then negatively charged.

Without being bound by theory, it is believed that the switch in polarity of the charges adjacent to the sides 14 and 16 of the web 12 contributes to an improvement in the charge density of the charged web as well as an improvement in the lifetime of the charge in the web. The specific reasons for this observed improvement are currently unknown to the inventors.

Figure 2:
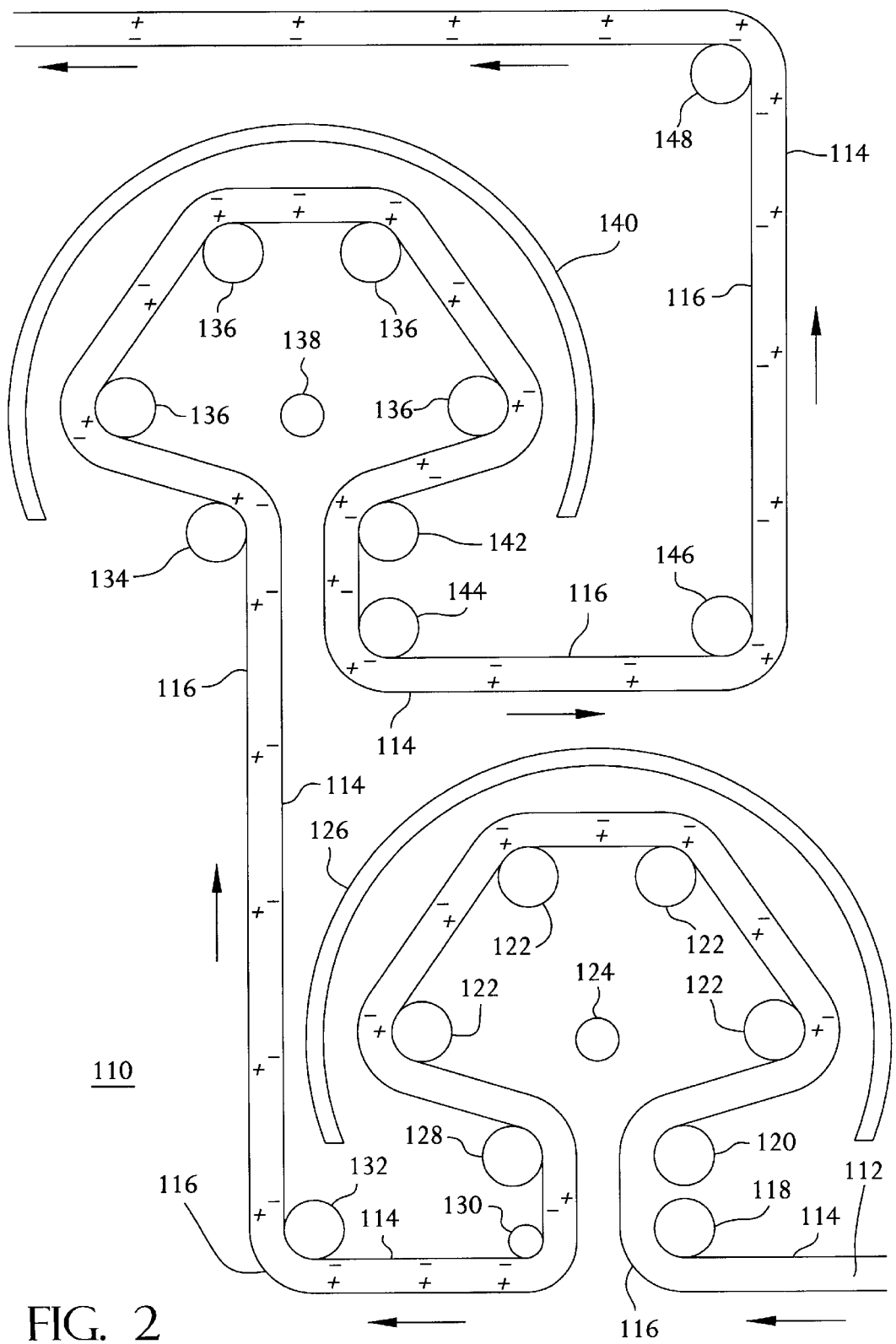
FIG. 2 is a schematic view of another embodiment of the present invention for cold charging a web.

Another embodiment is shown in FIG. 2 which shows an alternate apparatus 110 for cold charging a web in accordance with the present invention. The depicted apparatus 110 generally comprises an uncharged moving web 112 having a first side 114 and a second side 116. The web 112 may have a triboelectric charge associated with the relative inherent electronegative/positive nature of the polymer. In addition, the web 112 may be a web that has been precharged by either a hot or cold charging process. The uncharged web 112 passes into the apparatus 110 with the first side 114 in contact with a first positioning roller 118. The web 112 then passes over a second positioning roller 120 and onto first insulating positioning rollers 122 which position the web 112 between the first charging wire 124 and the first charging shell 126. The rollers 122 are generally made of insulating materials such as wood, plastic, or ceramic.

In the following discussion, the first charging wire 124 is assumed to be "negatively charged" (i.e., at a negative potential) and the first charging shell 126 is assumed to be positively charged (i,e., at a positive potential). These assumptions are for the ease of describing the operation of the invention only and are not intended to limit the scope of the invention to those specific relative potentials.

The charges on the first charging wire 124 and the first charging shell 126 induce a charge in the web 112 such that there is a relative positive charge adjacent the second side 116 of the web 112 and a relative negative charge adjacent the first side 114 of the web 112.

The web 112 then passes on to third, fourth, fifth, and sixth positioning rollers 128–134 before passing onto second insulating positioning rollers 136 which position the web 112 between the second charging wire 138 and the second charging shell 140. Again, the rollers 136 are generally made of insulating materials such as wood, plastic, or ceramic.

The charges (i.e., potentials) on the second charging wire 138 and the second charging shell 140 induce a change in the polarity of the charge in the web 112 such that there is a relative negative charge adjacent the second side 116 of the web and a relative positive charge adjacent the first side 114 of the web 112. The web 112 then passes over the positioning rollers 142–148 and out of the apparatus 110.

Figure 4:
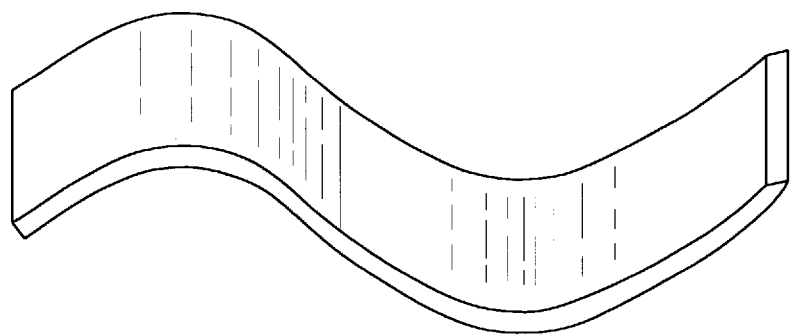
FIG. 4 is a schematic of a split film fiber.

As in the apparatus 10 described in FIG. 1, the apparatus 110 of FIG. 4 provides a web which has had the polarity of its charge changed during the charging process. Again, the resulting web retains a long lasting high charge density. This is shown in the increase of and the relative stability of the filtration efficiency of webs treated according to the present invention.

Again, there is a general decrease in the number and size of pinholes (due to arcing between the drum and the charging bar) in the charged web. As in the apparatus shown in FIG. 1, the apparatus shown in FIG. 2 has a dispersed electric field. The electric field lines from the charging bar to the shell are spread across a rather wide area.

Figure 3:
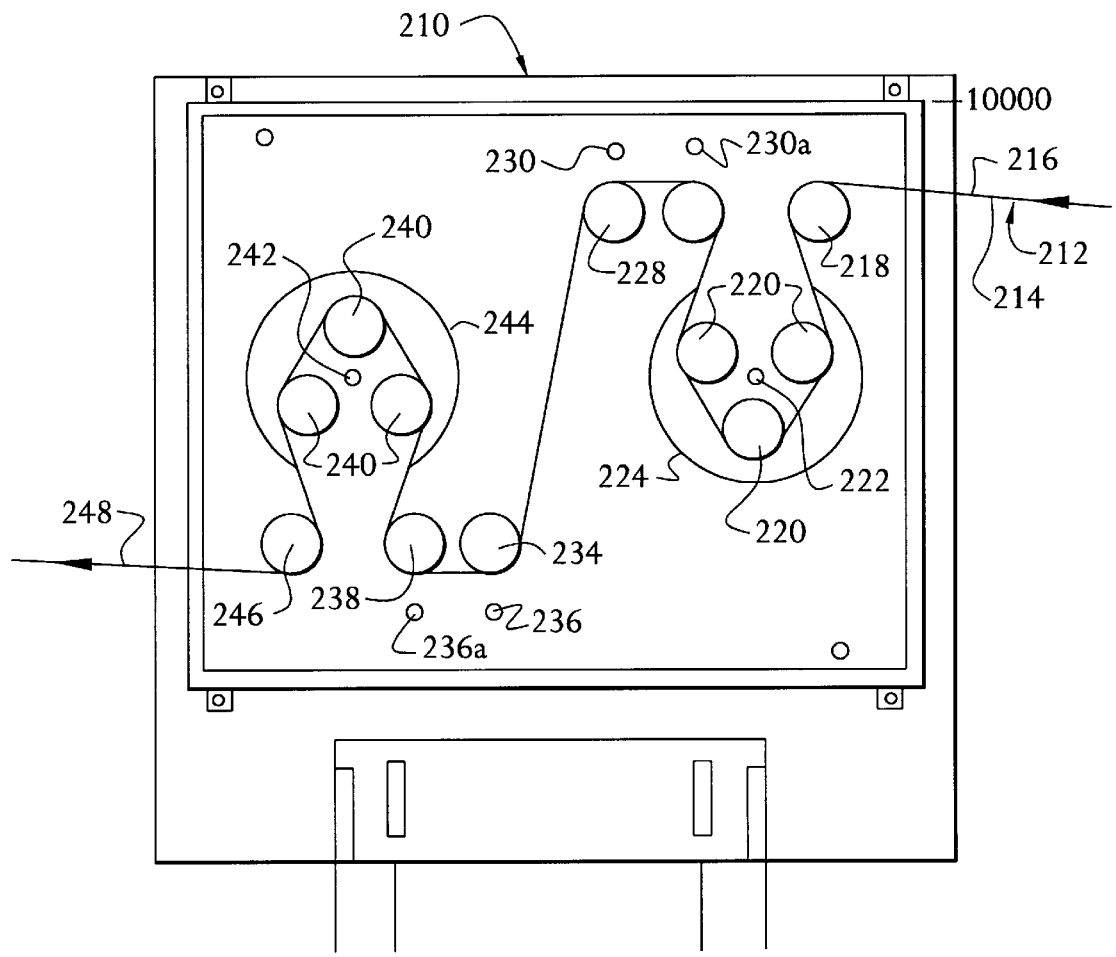
FIG. 3 is a schematic view of an embodiment of the present invention for cold charging a web which permits varied charging of the web using different processes, both alone and in combination.

FIG. 3 shows yet another alternative apparatus 210 for cold charging a web in accordance with the present invention. The apparatus 210 is configured to charge webs using charging techniques which can vary, as desired. This may include the charging of webs with a biased metal or otherwise conductive drum or roller together with a biased or grounded charging bar, similar to the charging technique discussed in conjunction with FIG. 1 of the drawings. This may also include the charging of webs with a charging bar and a charging shell substantially surrounding and apart from the charging bar, similar to the charging technique discussed in conjunction with FIG. 4 of the drawings. This may even include desired combinations of these two charging techniques. Essentially, this is accomplished by activating or deactivating (or connecting or disconnecting) desired sections of the apparatus 210 to achieve the charging technique which is desired.

The apparatus 210 operates upon an uncharged moving web 212 having a first side 214 and a second side 216. The uncharged web 212 enters the apparatus 210, coming into contact with a first positioning roller 218, which may be either an insulative or conductive roller. The web 212 is then passed to a series of insulating positioning rollers 220 which position the web 212 between a charging wire 222 and a first charging shell 224. The web 212 is then passed over a positioning roller 226, and is caused to contact a first charging drum 228, which must be conductive. A charging bar 230 is operatively combined with the charging drum 228.

Following a transition, at 232, the web 212 is caused to contact a second charging drum 234. A charging bar 236 is operatively combined with the charging drum 234, which is conductive. The web 212 is then passed over a positioning roller 238, and is in turn directed to a series of positioning insulating rollers 240 which position the web 212 between a charging wire 242 and a second charging shell 244. Following this, the web 212 is passed over a positioning roller 246, which may be either conductive or nonconductive, and is directed from the apparatus 210, at 248.

It will be appreciated that the apparatus 210 essentially constitutes an operative combination of an apparatus in accordance with FIG. 1 of the drawings (herein referred to as "Technique I"), and an apparatus in accordance with FIG. 2 of the drawings (herein referred to as "Technique II"). Through selective use of the four sections represented by the charging wire 222 and the charging shell 224, the charging bar 230 and the charging drum 228, the charging bar 236 and the charging drum 234, and the charging wire 242 and the charging shell 244, various combinations of the techniques previously described for cold charging a web of material may be developed. This allows the charging technique to be tailored to the type of web (e.g., material, thickness, etc.) which is to be operated upon.

For example, it has been found that relatively thin webs can be more efficiently charged with an apparatus according to FIG. 1 (Technique I). This is achievable by activating the charging bars 230, 236 and the conductive charging drums 228, 234. It has been found that relatively thick webs can be more efficiently charged with an apparatus according to FIG. 2 (Technique II). This is achievable by activating the charging wires 222, 242 and the charging shells 224, 244. It has even been found that combinations of the techniques represented by FIG. 1 and FIG. 2 of the drawings (herein referred to as "Technique III") are useful in certain circumstances. For example, it has been found that thin polypropylene webs (on the order of 20 g/m$^2$ or less) will show a particularly enhanced filtration efficiency (on the order of 91.69%) if charged with a combination of the techniques represented by FIG. 1 and FIG. 2 (Technique III). Referring again to FIG. 3, this is achievable by activating the charging wires 222, 242 and the charging bars 230, 236, as well as the charging shells 224, 244 and the charging drums 228, 234, to achieve a charging of the web 212 through combination of the techniques previously described.

Alternatively, for certain webs, it has been found to be advantageous to use an apparatus including only one component of an apparatus according to FIG. 1 (Technique I) and only one component of an apparatus according to FIG. 2 (Technique II). Again referring to FIG. 3, and as an example, such an apparatus could include a combination of the charging bar 222 and the charging shell 224, and the charging wire 230 and the charging drum 228. For further flexibility in charging of the web 212, the apparatus 210 can include additional charging wires 230a, 236a associated with corresponding charging drums (in place of the rollers 226, 238), if desired.

Definitions: In order to better understand the terms used herein, including the Tables and Examples below, the following definitions consistent with accepted technical definitions in the industry, are submitted.

Filtration Efficiency—is the measure of the ability of a web to remove particles from a flow of (gaseous or liquid) fluid. The filtration efficiency is related to the penetration ability, P, of small particles and is calculated as:

filtration efficiency (100−P)%.

Filter Quality—is another measure of the ability of a web to remove particles from a flow of (gaseous or liquid) fluid.

The filter quality, $q_F$, is related to the particle penetration through a web,P and to the pressure drop across the web, _p, according to the formula:

$$q_F=[\ln(1/P)]/[\_p].$$

See William C. Hinds, "Aerosol Technology: Properties, Behavior, and Measurement of Airborne Particles," John Wiley & Sons, New York, p. 170 (1982), incorporated herein by reference.

Equipment

Filtration Measurement: TSI Model 8110 and Model 8160 automated filter tester were used for the measurement of media filtration efficiency.

With the Model 8110 tester two percent sodium chloride solution (20 g NaCl in 1 liter of water) was aerosolized by an aerosol generator. The NaCl/water drops in aerosol were heated and NaCl crystallites with a 0.1 $\mu$m diameter were formed. The mass concentration of NaCl in the air was 101 mg/m$^3$. Photometry was used to detect the volume concentration of the air in the upstream volume of the media ($C_u$) and the volume concentration of the air in the downstream volume of the media ($C_d$). The penetration ability of the NaCl particles was calculated as:

Penetration=P=$[C_d/C_u]$(100%)

The filtration tests were performed with both the TSI Model Testers 8110 and 8160 because many laboratories around the world still only have the Model 8110 Tester, which is accurate to only two decimal points. On the other hand, the much more sophisticated Model 8160 accurately measures filtration efficiencies to 99.999999%. This is because the Condensation Nucleus Counter (CNC) on the Model 8160 detects aerosol particles using a single-particle counting technique for concentrations below $10^4$ particles/cm$^3$ and a photometric technique for concentrations up to $10^7$ particles/cm$^3$. The CNC uses a highly stable, laser diode light source and has a large dynamic range which allows measurements of filters and single-sheet media efficiencies up to 99.999999%.

Although the TSI Model 8160 with the CNC can use virtually any aerosol as the challenge aerosol in flow rates ranging from 1.5 to 150 1/min, the filters in Tables I–IV below were challenged at flow rates on the order of 32 and 95 1/min (exact flow rates were recorded) to six different NaCl particles sizes ranging from 0.03 to 0.4 micrometers.

Figure 6:
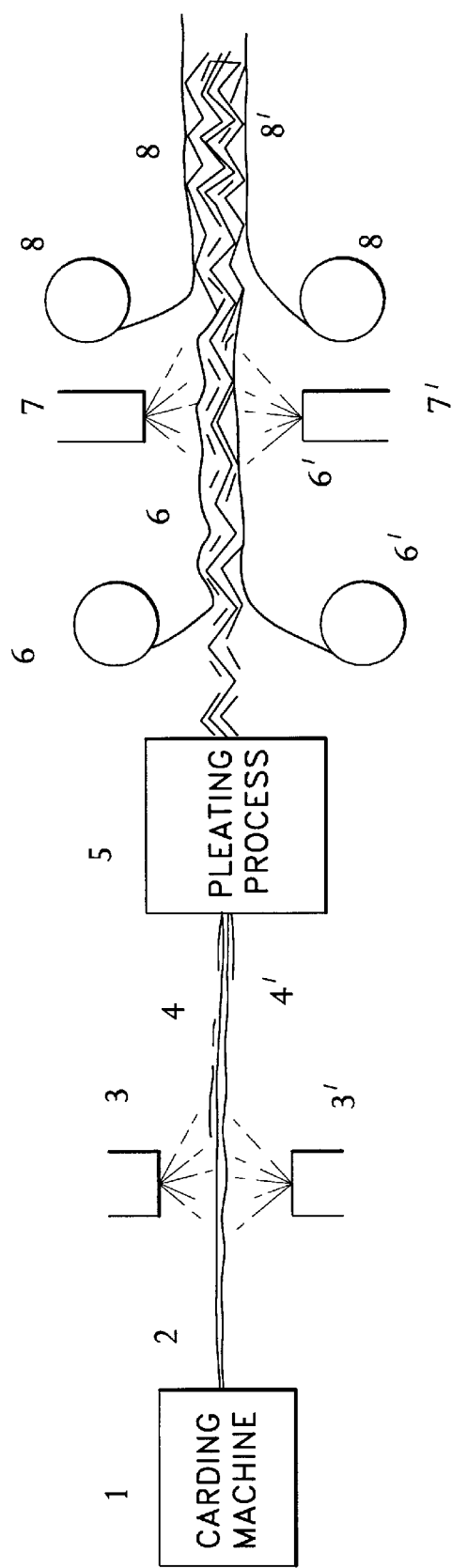
FIG. 6 is a schematic drawing showing an apparatus for producing the pleated carded webs of FIGS. 5a to 5k.

Webs in accordance with the invention were constructed on a production line 312 of the "STRUTO" type, which is schematically shown in FIG. 6 of the drawings. Such a production line can incorporate either a vibrating perpendicular lapper 314, as shown in FIGS. 6 and 6A or a rotating perpendicular lapper 316, as shown in FIG. 6B. In either case, the resulting products are characterized by fibers situated predominantly to the plane of such products, and the fibers molded into wave forms having an amplitude which is shorter than the length of the fibers.

FIG. 6A shows a vibrating perpendicular lapper 314, which initially receives a web 318 (in this case, a carded web) between an adhesive web 320 and a guide board 322. The adhesive web 320 and the guide board 322 serve to direct the web 318 onto a conveyor belt 324 (which may constitute the conveyor belt of the thru-air oven to be described more fully below). A forming comb 326 is received by an arm 328, which is in turn driven by a bell crank mechanism 330. The gear 330a driving the bell crank mechanism 330 meshes with a gear 332a driving a second bell crank mechanism 332, which causes reciprocating movement of a presser bar 334 (which preferably incorporates a series of needles). As the web 318 is introduced onto the conveyor belt 324, the comb 326 and the presser bar 334 are alternatingly driven (by the bell crank mechanism 330, 332) into and out of engagement with the web 318 so that the comb 326 produces pleats in the web 318, and so that the presser bar 334 compresses the pleats between the wire grid 320 and the conveyor belt 324. This results in a pleated web 336, which issues from the vibrating perpendicular lapper 314 as shown.

FIG. 6B shows a rotating perpendicular lapper 316, which similarly receives the web 318 for purposes of developing pleats. In this configuration, the web 318 is received between a feeding disk 338 and a fixed guide 340. Rotation of the feeding disk 338 causes the web 318 to pass from between the feeding disk 338 and the fixed guide 340, and into engagement with a working disk 342. The working disk 342 has a series of teeth 334 which form a series of arcuate cavities 346 for receiving the web 318 as it passes from between the feeding disk 338 and the fixed guide 340. Rotation of the working disk 342 (in a clockwise direction) operates to collect portions of the web 318 within the cavities 346 of the working disk 342, and between a wire grid 348 and the conveyor belt 324, forming pleats in the web 318. These pleats are then compressed by the back edges 350 of the teeth 344, producing the pleated web 336.

Further discussions of the production line 312 of FIG. 6 will proceed with reference to a vibrating perpendicular lapper such as is illustrated in FIG. 6A, although it is to be understood that the rotating perpendicular lapper 316 of FIG. 6B is equally useful in such an apparatus. Referring now to FIG. 6, the fibers forming the unpleated web 318 are received from a carding machine 352. As previously described, the web 318 received from the carding machine 352 (e.g., traveling at a speed of about 7 m/min) is introduced between the adhesive web 320 and the guide board 322 of the vibrating perpendicular lapper 314, and is received upon the conveyor belt 324, which in this case constitutes the conveyor belt of a "thru-air" oven 354. The nonwoven web 308 or supporting scrim is simultaneously introduced (unwound from a feed roller 356) into the vibrating perpendicular lapper 314 so that the nonwoven web 308 comes to rest upon the conveyor belt 324.

Figure 5A:
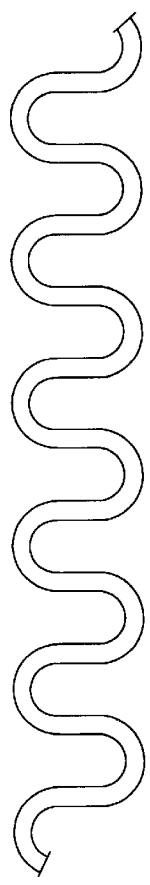
FIG. 5a is a schematic of a pre-electrically charged, carded, pleated web of split film fibers.
Figure 5B:
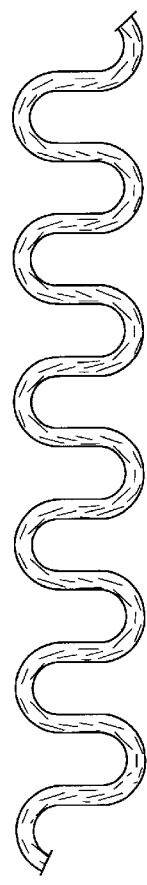
FIG. 5b is a schematic of a pre-electrically charged web of split film fibers to which bi-component binder fibers were added prior to pleating.
Figure 5C:
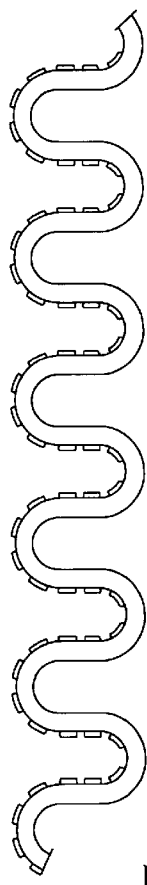
FIG. 5c is a schematic of a pre-electrically charged, carded, pleated web of split film fibers which was given a light coating (1–4 g/sq m) of melt blown heat sensitive fibers on the top surface after carding and before the pleating process.
Figure 5D:
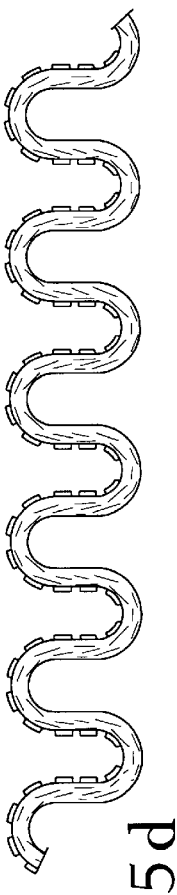
FIG. 5d is a schematic of a pre-electrically charged carded, pleated web of split film fibers with a blend of bi-component binder fibers which was given a light coating (1–4 g/sq m) of melt blown heat sensitive fibers on the top surface after carding and before the pleating process.

Downward movement of the forming comb 326 of the vibrating perpendicular lapper 314 forms a pleated structure (so-called "micropleats", corresponding to the pleated carded split film fiber webs 306, 306 I, 306 II of FIGS. 5a, 5b, 5c, and the pleated carded webs 336 of FIGS. 6A and 6B) which is caused to rest upon a support fabric (corresponding to the nonwoven web 308). By way of illustration, the carded web 318 may have a weight of about 10 to 100 g/m2, resulting in pleated carded webs 306, 306 I and 306 II.

The resulting structure (a combination of the pleated structure and the support fabric) then enters the thru-air oven 354, which fuses the thermoplastic fibers of the pleated structure to each other and to the thermoplastic fibers of the support fabric. By way of example, and for a thru-air oven 354 having a length of 1 meter, the oven was heated, so that the fabric temperature will not exceed 100° C. while in the oven, with a conveyor speed (conveyor belt 324) of about 0.1 to 6.0 m/min. The conveyor speed and the oven temperature will vary with the length of the oven which is used.

If desired, an adhesive web between pleated web and supply nonwoven or scrim on the other side (not shown in FIGS. 5a–5e), may be applied to the top surface of the support fabric (the nonwoven web 308) as it is introduced into the vibrating perpendicular lapper 314 as previously described (drawn from the roller 364 of FIG. 6), to further improve adhesion of the pleated structure to the support fabric. The bonded, laminated structure issuing from the thru-air oven 354 is then collected, either by hand or with a take-up apparatus 358.

Typically, low melt point fibers shown in FIG. 5c will soften and stick to other split fibers at a temperature which is 10° to 600° C. lower than the temperature of the split fiber. An oven 354 having a length of 3.35 meters, an operating temperature of from 90° to 150° C., and a fabric transport speed of from 1 to 6 m/min, has generally been found to be appropriate. The selected parameters of operation will depend upon the softening point of the lowest melting point material in the composite structure.

Figure 5E:
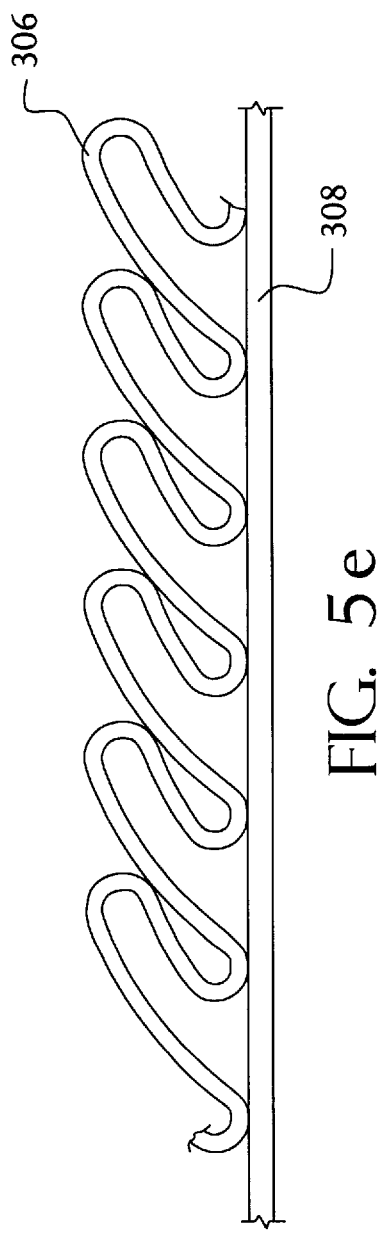
FIG. 5e is a schematic of a carded pleated web of split film fiber with a low number of pleats which are unable to reinforce each other structurally, resulting in a collapse of the pleats onto the supporting nonwoven or scrim. The supporting nonwoven may melt blown, spunbond, dry-laid, wet-laid, thermally bonded staple fiber web hydroentangled or with other types of nonwovens. The scrim may be made from apertured films and other products.
Figure 5F:
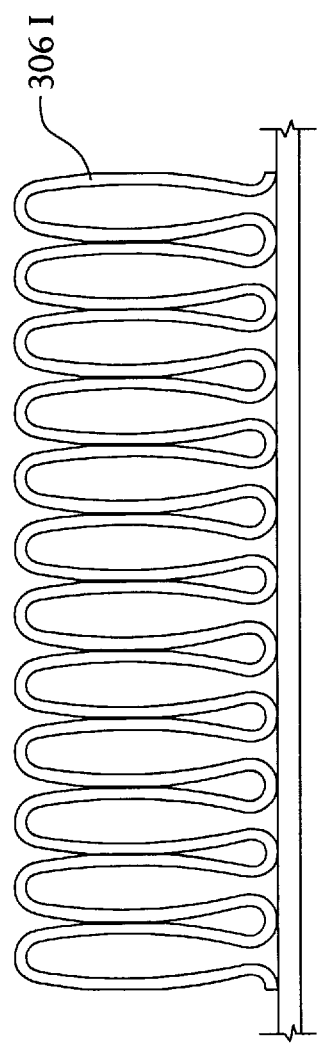
FIG. 5f is a schematic of a more rigid pleated carded web with a high number of pleats which are capable of supporting each other and maintaining a vertical orientation with respect to the base nonwoven or scrim. Not illustrated in FIGS. 5e and 5i are the different types of materials and techniques for adhering the pleated carded webs of split fiber webs to the nonwovens or scrim support. Adhesives include low melting temperature heat fusible webs made by melt blown, spunbond, and dry-laid nonwoven processes. Also, a hot melt, temperature sensitive adhesive may be sprayed onto the supporting fabric while bringing the composite components together.
Figure 5G:
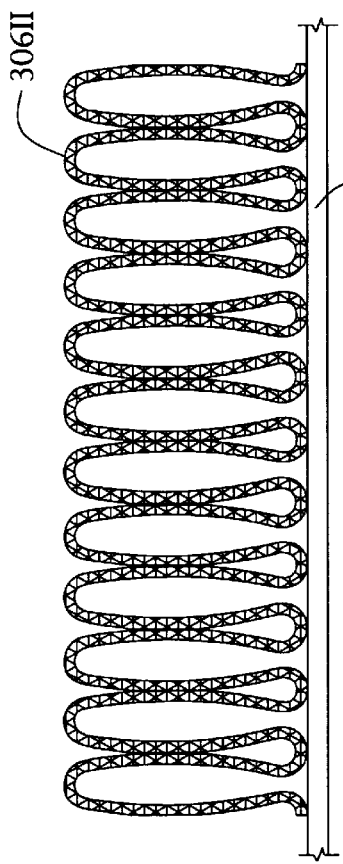
FIG. 5g is a schematic illustrating the blending of low melting fibers such as bi-component fibers with a core of PP and a sheath of PE. Use of the more heat sensitive bi-component fibers ensures better thermal sticking of the pleated webs of the split film fibers to each other during the subsequent heat treating process and to the supporting substrate, which may also eliminate the necessity of using an adhesive between the pleats.
Figure 5H:
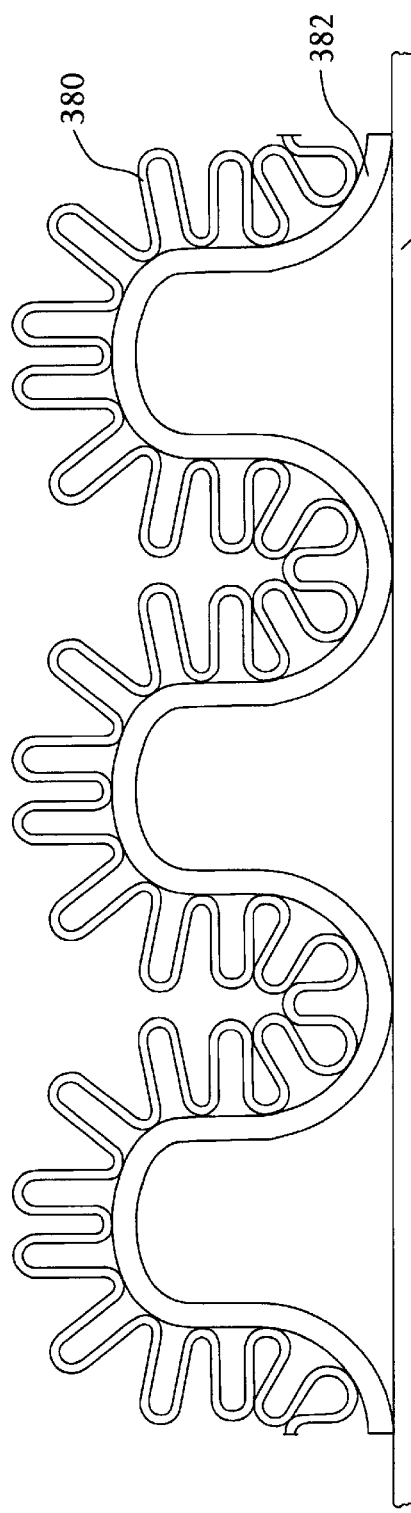
FIG. 5h is a schematic illustrating how the structures shown in FIGS. 5e, 5f and 5g can be pleated to form a combination of "micro-pleated" webs of split film fibers imposed over "macro" pleats formed by pleating the laminate of split fiber web and adhering it to a nonwoven or supporting film.
Figure 5I:
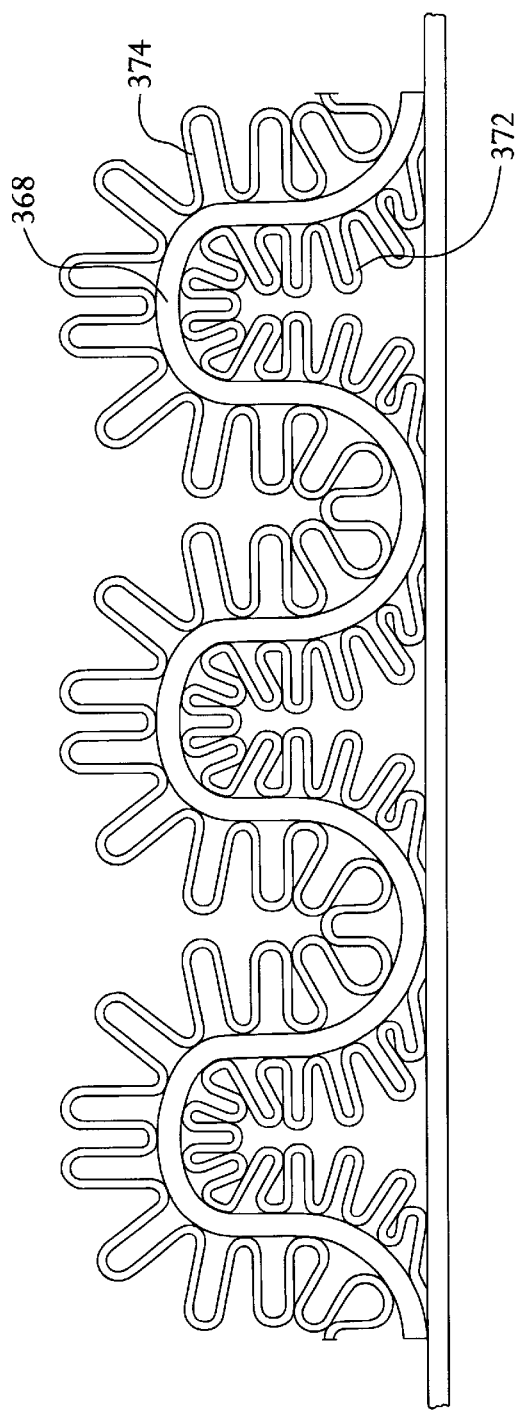
FIG. 5i is a schematic of the composite described in FIG. 5d in which a second "micro-pleated" web of the split film fiber is adhered to the underside of the "macro-pleated" composite, which is in turn adhered to a flat nonwoven or scrim.
Figure 5J:
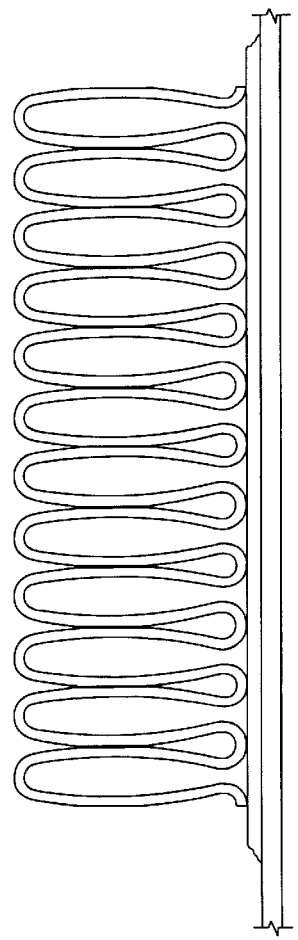
FIG. 5j is a schematic in which a melt blown web is pleated and adhered to a flat nonwoven or scrim.
Figure 5K:
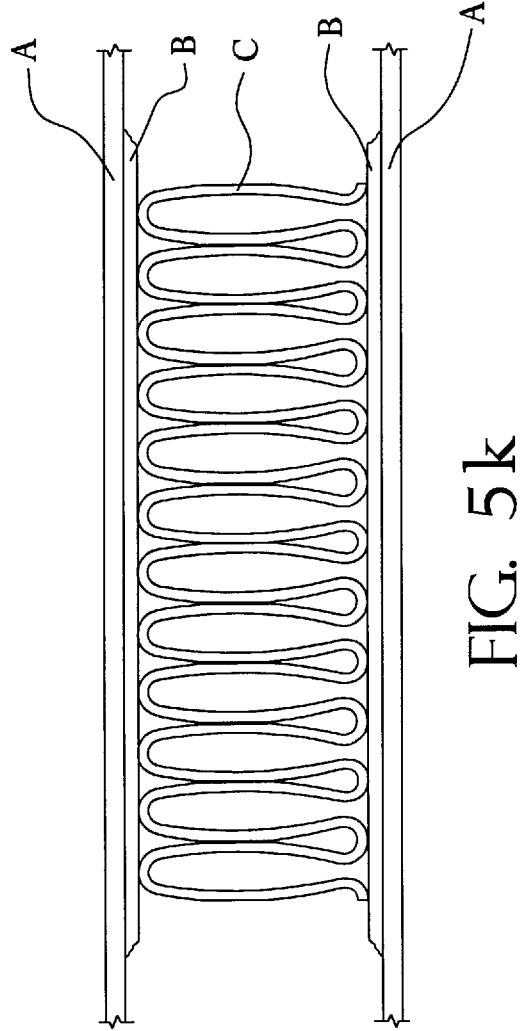
FIG. 5k is a schematic of the structures in FIG. 5j in which an adhesive layer and another nonwoven or scrim is applied to the top of the pleated melt blown web.

The composite web shown in FIG. 5i was prepared by depositing a nonwoven or supply scrim web 368 (drawn from the roller 370 of FIG. 6) onto a pleated carded web 372, in a first pass, and by then turning the resulting laminate over and depositing a second unpleated carded web 374 onto the nonwoven or scrim web 368, in a second pass. The resulting (three-layer) laminate was than passed through the vibrating perpendicular lapper 314 and the thru-air oven 354 in order to produce the large pleats shown (so-called "macropleats") Another nonwoven or scrim 376 was also fed onto the conveyor belt 324 (drawn from the roller 378 of FIG. 6, in either the same or separate pass) and, together with the composite comprised of the webs 368, 372, 374, was fed through the thru-air oven 354 to form the large pleats shown and to attach the structure to the nonwoven or scrim 376. An adhesive web 320, which is not shown in FIG. 5i (e.g., drawn from the roller 364 of FIG. 6) may also be positioned between the composite compromised of the Webs 368, 372, 374 and the scrim or nonwoven 376 (prior to introduction to the thru-air oven) to improve the adhesion achieved at this interface.

The composite shown in FIG. 5h was prepared by first applying a carded, pleated web 380 to a nonwoven or scrim. The resulting composite was then turned over and passed through the vibrating perpendicular lapper 314, together with another nonwoven or supporting scrim web 308 (which serves as a support fabric). In this way, the vibrating perpendicular lapper 314 operates to form the relatively large pleats shown (macropleats), without putting micropleats into the carded web 380. The several layers of the resulting composite web shown in FIG. 5h (including the carded split fibers, with or without bi-component binder fibers, the nonwoven or scrim or the other supporting fabrics), were thermally adhered together upon exiting the thru-air oven 354.

To be noted is that the macropleats of FIGS. 5h and 5i can be formed in different ways, other than with a lapper as previously described. For example, such pleats may be formed as air laid, wet laid or dry laid pleats using aerodynamic and/or mechanical techniques.

The foregoing webs were subjected to testing. Tables I and II show the results of testing the sample described in FIG. 5e at low and high aerosol flow rates, respectively. In Table I the low density (300 g/sq m) pleated web of split film fibers had excellent filtration efficiencies to sodium chloride particles ranging in size from 0.03 to 0.400 $\mu$m at a face velocity of 5.39 cm/s (32.33 l/mm) as tested on the TSI Model 8160 Filter Tester. Over this particle size range the filtration efficiencies ranged from 98.899 to 99.988%, and the final pressure drop was only 1.97 mm of water. At the high aerosol flow rates, this lower weight sample which had much fewer pleats per unit length had only slightly lower filtration efficiencies as determined on both the TSI Model 8160 and 8110 filter testers. The pressure drop as determined by the Model 8160 tester only increased from 1.97 to 6.15 mm water in going from the low to the high flow rates.

TABLE I

FILTRATION TESTING AT LOW FLOW RATES
(Sample with a weight of 300 g/m$^2$ Described in FIG. 5e)

A. Face Velocity of 5.39 cm/s (32.33 l/min) with Different Size Particles of NaCl using a TSI Model 8160 Filter Tester

| Particle Size $\mu$m | Upstream p/cm$^{-3}$ | Downstream p/cm$^{-3}$ | Penetration % | 95/cl % | Efficiency % |
|---|---|---|---|---|---|
| 0.030 | 2.75 E + 04 | 3.03 E + 02 | 1.1008666 | +0.0 | 98.899 |
| 0.090 | 1.65 E + 04 | 7.55 E + 01 | 0.4564917 | +0.0 | 99.544 |
| 0.120 | 4.32 E + 04 | 7.36 E + 01 | 0.1704688 | +0.0 | 99.830 |
| 0.150 | 3.10 E + 04 | 3.04 E + 01 | 0.0979855 | +2.2 | 99.902 |
| 0.300 | 6.57 E + 03 | 1.37 E + 00 | 0.0208444 | 10.2 | 99.979 |
| 0.400 | 2.55 E + 03 | 2.97 E − 01 | 0.0116448 | 18.7 | 99.988 |

Total Challenge time of 7 minutes with a final pressure drop of 1.97 mm H$_2$O.
B. Face Velocity of 5.3 cm/s (31.9 l/min) using a TSI Model 8110 Filter Tester with 0.1 $\mu$m NaCl Particles.

| Particle Size ($\mu$m) | Pressure drop ($\mu$m H$_2$O) | Penetration (%) | Efficiency (%) |
|---|---|---|---|
| 0.10 | 2.1 | 0.001 | 99.99 |

TABLE II

FILTRATION TESTING AT HIGH FLOW RATES
(Sample with a weight of 300 g/m$^2$ Described in FIG. 5e)

A. Face Velocity of 16.03 cm/s (96.19 l/min) with Different Size Particles of NaCl Particles using a TSI Model 8160 Filter Tester

| Particle Size $\mu$m | Upstream p/cm$^{-3}$ | Downstream p/cm$^{-3}$ | Penetration % | 95/cl % | Efficiency % |
|---|---|---|---|---|---|
| 0.030 | 9.05 E + 03 | 3.97 E + 02 | 4.1786256 | +0.0 | 95.821 |
| 0.090 | 5.87 E + 03 | 1.27 E + 02 | 2.1710566 | +0.0 | 97.829 |
| 0.120 | 1.57 E + 04 | 1.70 E + 02 | 1.0829746 | +0.0 | 98.917 |
| 0.150 | 1.10 E + 04 | 8.48 E + 01 | 0.7683947 | +0.0 | 99.232 |
| 0.300 | 2.41 E + 03 | 6.99 E + 00 | 0.2896545 | +4.5 | 99.710 |
| 0.400 | 9.27 E + 02 | 1.49 E + 00 | 0.1605918 | +9.9 | 99.839 |

Total Challenge time of 7 minutes with a final pressure drop of 6.15 mm H$_2$O.
B. Face Velocity of 16.52 cm/s (99.7 l/min) using a TSI Model 8110 Filter Tester with 0.1 $\mu$m NaCl Particles.

| Particle Size ($\mu$m) | Pressure drop ($\mu$m H$_2$O) | Penetration (%) | Efficiency (%) |
|---|---|---|---|
| 0.10 | 1.4 | 0.033 | 99.96 |

In Tables III and IV the results of testing the sample described in FIG. 5f are shown. As expected, this sample had higher filtration efficiencies and only slightly higher pressure drops as tested by both The Model 8160 and 8110 units at both low and high aerosol flow rates even though it was much denser with a basis weight of 600 g/sq m. The lower increase in pressure drop that had been anticipated may be attributed to the fact that the number of pleats were also increased, thereby making the pleated pile more vertical so that the air was directed along the lengths of the fibers resulting in lower air resistance.

TABLE III

FILTRATION TESTING AT LOW FLOW RATES
(Sample with a weight of 600 g/m² Described in FIG. 5f)

A. Face Velocity of 5.43 cm/s (32.55 l/min) with Different Size Particles of NaCl Particles using a TSI Model 8160 Filter Tester

| Particle Size $\mu$m | Upstream p/cm$^{-3}$ | Downstream p/cm$^{-3}$ | Penetration % | 95/cl % | Efficiency % |
|---|---|---|---|---|---|
| 0.030 | 2.71 E + 04 | 8.04 E + 01 | 0.2967845 | +0.0 | 99.703 |
| 0.090 | 1.73 E + 04 | 1.47 E + 01 | 0.0847444 | +3.1 | 99.915 |
| 0.120 | 4.50 E + 04 | 1.06 E + 01 | 0.0234767 | +3.7 | 99.977 |
| 0.150 | 3.23 E + 04 | 3.39 E + 00 | 0.0105038 | +6.4 | 99.989 |
| 0.300 | 6.79 E + 03 | 1.30 E − 01 | 0.0019145 | +19.9 | 99.998 |
| 0.400 | 2.56 E + 03 | 20 | 0.0004842 | +54.0 | 99.9995 |

Total Challenge time of 7 minutes with a final pressure drop of 2.90 mm H₂O.
B. Face Velocity of 5.3 cm/s (31.9 l/min) using a TSI Model 8110 Filter Tester with 0.1 $\mu$m NaCl Particles.

| Particle Size ($\mu$m) | Pressure drop ($\mu$m H₂O) | Penetration (%) | Efficiency (%) |
|---|---|---|---|
| 0.10 | 3.3 | 0.001 | 99.999 |

TABLE IV

FILTRATION TESTING AT HIGH FLOW RATES
(Sample with a weight of 600 g/m² Described in FIG. 5g)

A. Face Velocity of 15.95 cm/s (95.71 l/min) with Different Size Particles of NaCl Particles using a TSI Model 8160 Filter Tester

| Particle Size $\mu$m | Upstream p/cm$^{-3}$ | Downstream p/cm$^{-3}$ | Penetration % | 95/cl % | Efficiency % |
|---|---|---|---|---|---|
| 0.030 | 9.24 E + 03 | 1.69 E + 02 | 1.8265489 | +0.0 | 99.173 |
| 0.090 | 6.03 E + 03 | 4.14 E + 01 | 0.6857234 | +0.0 | 99.314 |
| 0.120 | 1.56 E + 04 | 4.37 E + 01 | 0.2793285 | +0.0 | 99.721 |
| 0.150 | 1.12 E + 04 | 1.87 E + 01 | 0.1674447 | +2.7 | 99.833 |
| 0.300 | 2.35 E + 03 | 1.03 E + 00 | 0.0437145 | +11.7 | 99.956 |
| 0.400 | 9.18 E + 02 | 1.54 E − 01 | 0.0168198 | +19.8 | 99.983 |

Total Challenge time of 7 minutes with a final pressure drop of 9.14 mm H₂O.
B. Face Velocity of 16.52 cm/s (99.7 l/min) using a TSI Model 8110 Filter Tester with 0.1 $\mu$m NaCl Particles.

| Particle Size ($\mu$m) | Pressure drop ($\mu$m H₂O) | Penetration (%) | Efficiency (%) |
|---|---|---|---|
| 0.10 | 10.7 | 0.005 | 99.99 |

When the samples produced as described in FIGS. 5a, 5b, 5c, 5g, 5h, 5i, 5j and 5k are also tested, it is expected that remarkably high filtration efficiencies with equally remarkable low pressure drops will be obtained. Furthermore, it is anticipated that even better filtration efficiencies will be obtained when all of the structures described in examples 5a through 5k, and variation thereof are electrostatically charged by the combination of Tantret™ Technique I and II (Technique III) and by Tantret™ Technique IV (U.S. Pat. No. 5,592,357, Rader, Alexeff, Wadswoth and Tsai, January, 1997).

The above examples and description fully disclose the present invention including preferred embodiments thereof. The invention, however, is not limited to the precise embodiments described herein but includes all modifications encompassed with the scope and spirit of the following claims.

What is claimed is:

1. A fibrous structure comprising a carded web of thermoplastic split film fibers, the web defining a serpentine-like arrangement of a multiplicity of pleats in which adjoining pleats physically contact each other thereby causing the structure to be self supporting.

2. The fibrous structure of claim 1 in which the pleats have curved bases defining a base plane and the pleats are aligned at an angle relative to the base plane.

3. The fibrous structure of claim 1 in which the pleats have curved bases defining a base plane and the pleats are aligned substantially perpendicular to the base plane.

4. The fibrous structure of claim 1 in which the pleats have curved bases defining a base plane and the pleats are aligned at an angle in the same direction away from perpendicular to the base plane.

5. The fibrous structure of claim 1 further comprising a substantially flat support affixed to the curved bases.

6. A fibrous structure comprising a carded web of thermoplastic split film fibers, the web comprising a serpentine-like arrangement of a multiplicity of macropleats in which adjoining pleats are spaced apart to define convex curved mounds and concave curved valleys, and a serpentine-like arrangement of a multiplicity of a first serpentine-like arrangement of micropleats affixed to the first side of the serpentine-like arrangement of macropleats.

7. The fibrous structure of claim 6 further comprising a second serpentine-like arrangement of a multiplicity of micropleats and in which the serpentine-like arrangement of macropleats are sandwiched between the serpentine-like arrangement of micropleats.

8. The fibrous structure of claim 7 in which a plurality of adjoining micropleats physically contact each other and in which a plurality of adjoining micropleats do not physically contact each other.

9. The fibrous structure of claim 6 in which micropleats are positioned on the mounds and in the valleys.

10. The fibrous structure of claim 9 in which a plurality of adjoining micropleats in the valleys physically contact each other.

11. The fibrous structure of claim 10 in which five adjoining micropleats in the valleys physically contact each other.

12. The fibrous structure of claim 10 in which adjoining micropleats on the mounds are spaced apart from each other.

13. The fibrous structure of claim 6 further comprising a substantially flat support affixed to the macropleats on a second side of the serpentine-like arrangement of macropleats opposite the micropleats.

14. The fibrous structure of claim 13 in which the flat support is a scrim.

15. The fibrous structure of claim 13 in which the flat support is a nonwoven material.

16. The fibrous structure of claim 6 in which the mounds are narrower than the valleys.

17. The fibrous structure of claim 6 in which the mounds and valleys are semicircular.

18. The fibrous structure of claim 6 in which the first serpentine-like micropleats have substantially identical width.

19. The fibrous structure of claim 6 in which macropleats define a second side of the serpentine-like arrangement of macropleats opposite the first side and the second side of the serpentine-like arrangement of macropleats defines concave curved surfaces on which a second serpentine-like arrangement of micropleats has adjoining micropleats in physical contact with each other.

20. The fibrous structure of claim 19 in which the second side of the serpentine-like arrangement of macropleats further defines convex curved surfaces and adjoining micropleats of the second serpentine-like arrangement positioned on the convex curved surfaces are spaced apart from each other.

21. The fibrous structure of claim 18 further comprising a substantially flat support affixed to the second side of the serpentine-like arrangement of macropleats.

22. The fibrous structure of claim 1 in which the fibers are electrostatically charged.

23. The fibrous structure of claim 6 in which the fibers are electrostatically charged.

24. The fibrous structure of claim 20 in which the support is affixed to the structure with an adhesive.

25. The fibrous structure of claim 23 in which the adhesive is a heat-sensitive adhesive.

26. The fibrous structure of claim 20 in which the support is affixed to the structure thermally.

27. The fibrous structure of claim 5 in which the support is a nonwoven of a melt-blown, spunbond, dry-laid, wet-laid or a bonded staple fiber web.

28. The fibrous structure of claim 1 in which the split film fibers are blended with multi-component fibers.

29. The fibrous structure of claim 6 in which the split film fibers are blended with multi-component fibers.

30. The fibrous structure of claim 28 in which the multi-component fibers are bi-component fibers.

31. The fibrous structure of claim 30 in which the bi-component fibers are polypropylene/polyethylene blended fibers.

32. The fibrous structure of claim 30 in which the bi-component fibers have a polypropylene core and a polyethylene sheath.

33. The fibrous structure of claim 30 in which the bi-component fibers have a sheath with a softening point in the range of about 10° to about 60° C. below that of the split film fibers.

34. A filter comprising the fibrous structure of claim 1.

35. A filter comprising the fibrous structure of claim 6.

* * * * *

Disclaimer

5,871,836-Schultink et al., Eksel (BE). COMPOSITE PLEATED FIBROUS STRUCTURES CONTAINING SPLIT FILM FIBERS. Patent dated Feb. 16, 1999. Disclaimer filed May 4, 2007, by the inventor.

Hereby enters this disclaimer to claims 1-35 of said patent.

*(Official Gazette February 19, 2008)*